US009146728B2

(12) United States Patent
Anderson

(10) Patent No.: US 9,146,728 B2
(45) Date of Patent: Sep. 29, 2015

(54) MOBILE APPLICATION CREATION PLATFORM

(75) Inventor: Benjamin Anderson, Minneapolis, MN (US)

(73) Assignee: Cinemotion, LLC, Minneapolis, MN (US)

( * ) Notice: Subject to any disclaimer, the term of this patent is extended or adjusted under 35 U.S.C. 154(b) by 0 days.

(21) Appl. No.: 13/566,088

(22) Filed: Aug. 3, 2012

(65) Prior Publication Data

US 2013/0036399 A1 Feb. 7, 2013

Related U.S. Application Data

(60) Provisional application No. 61/514,739, filed on Aug. 3, 2011.

(51) Int. Cl.
*G06F 9/44* (2006.01)
*G06F 9/445* (2006.01)
*G06F 17/30* (2006.01)

(52) U.S. Cl.
CPC .............. *G06F 8/65* (2013.01); *G06F 17/3089* (2013.01)

(58) Field of Classification Search
None
See application file for complete search history.

(56) References Cited

U.S. PATENT DOCUMENTS

| 7,350,205 | B2 * | 3/2008 | Ji | 717/172 |
| 2003/0177486 | A1 * | 9/2003 | Bakke et al. | 717/169 |
| 2004/0003117 | A1 * | 1/2004 | McCoy et al. | 709/246 |
| 2005/0204353 | A1 * | 9/2005 | Ji | 717/168 |
| 2006/0212846 | A1 * | 9/2006 | O'Farrell et al. | 717/116 |
| 2007/0022403 | A1 * | 1/2007 | Brandt et al. | 717/100 |
| 2008/0208365 | A1 * | 8/2008 | Grgic et al. | 700/2 |
| 2009/0195652 | A1 * | 8/2009 | Gal | 348/148 |
| 2010/0251292 | A1 * | 9/2010 | Srinivasan et al. | 725/37 |
| 2011/0145695 | A1 * | 6/2011 | Matsui | 715/234 |
| 2011/0209051 | A1 * | 8/2011 | Shiimori | 715/255 |
| 2011/0234613 | A1 * | 9/2011 | Hanson et al. | 345/589 |
| 2011/0267336 | A1 * | 11/2011 | Whatmough | 345/418 |
| 2012/0089669 | A1 * | 4/2012 | Berg et al. | 709/203 |

* cited by examiner

*Primary Examiner* — Isaac T Tecklu
(74) *Attorney, Agent, or Firm* — Patterson Thuente Pedersen, P.A.

(57) ABSTRACT

A system for creating mobile software applications that may be updated in real time without code changes, re-submittal or user updating. The system includes various types of media content, a content management system, mobile application and a mobile device. Media content is uploaded to the content management system where it is translated and organized in preparation for delivery to the mobile application and mobile device. A user interfaces with the mobile device to receive translated and organized media content for display on the mobile device.

10 Claims, 3 Drawing Sheets

MOBILE APPLICATION CREATION PLATFORM

RELATED APPLICATION

The present application claims the benefit of U.S. Provisional Application No. 61/514,739 filed Aug. 3, 2011, which is incorporated herein in its entirety by reference.

FIELD OF THE INVENTION

The present invention relates to mobile device technology. More particularly, the present invention relates to systems, devices, and methods for the development of mobile software applications.

BACKGROUND OF THE INVENTION

Traditional mobile development requires new code to be written for each new application. This code is then submitted to a mobile application store and downloaded by the end user. Changes or updates required to traditional development call for modifications to the original code, re-submission to a mobile application store, and a re-download by the end user.

Such traditional technology limits the ability of applications to be updated in real-time without code changes, re-submittal, or user updating.

SUMMARY OF THE INVENTION

In one embodiment, the present invention includes a system for creating mobile software applications that may be updated in real time without code changes, re-submittal or user updating. The system includes various types of media content, a content management system, mobile application and a mobile device. Media content is uploaded to the content management system where it is translated and organized in preparation for delivery to the mobile application and mobile device. A user interfaces with the mobile device to receive translated and organized media content for display on the mobile device.

DESCRIPTION OF THE DRAWINGS

The invention may be more completely understood in consideration of the following detailed description of various embodiments of the invention in connection with the accompanying drawings, in which.

Figure 1:
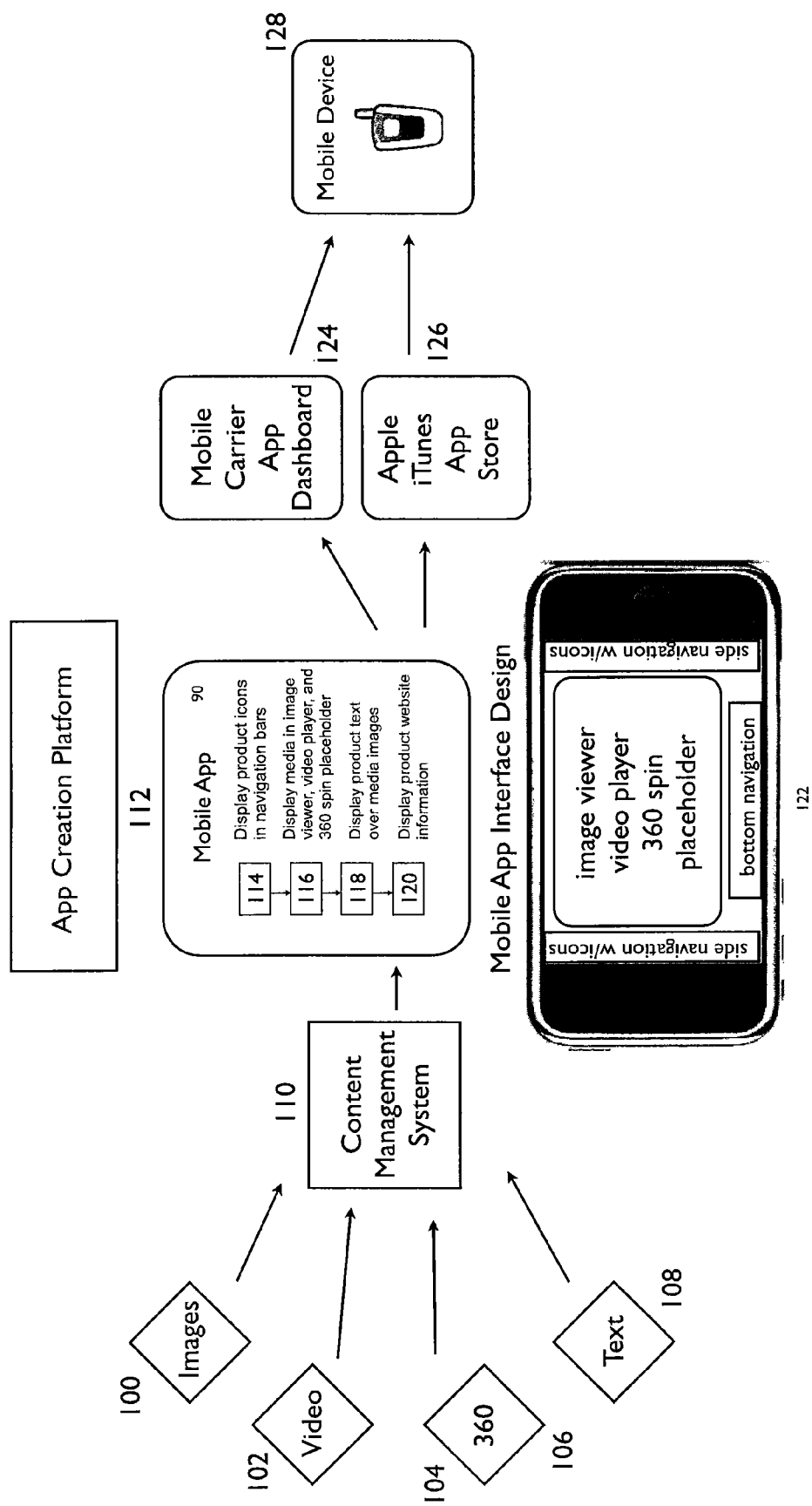
FIG. 1 is a block diagram of a mobile application creation platform, according to an embodiment of the present invention.

While the invention is amenable to various modifications and alternative forms, specifics thereof have been shown by way of example in the drawings and will be described in detail herein. It should be understood, however, that the intention is not to limit the invention to the particular embodiments described. On the contrary, the intention is to cover all modifications, equivalents, and alternatives falling within the spirit and scope of the invention as defined by the appended claims.

DESCRIPTION OF THE PREFERRED EMBODIMENTS

Figure 2:
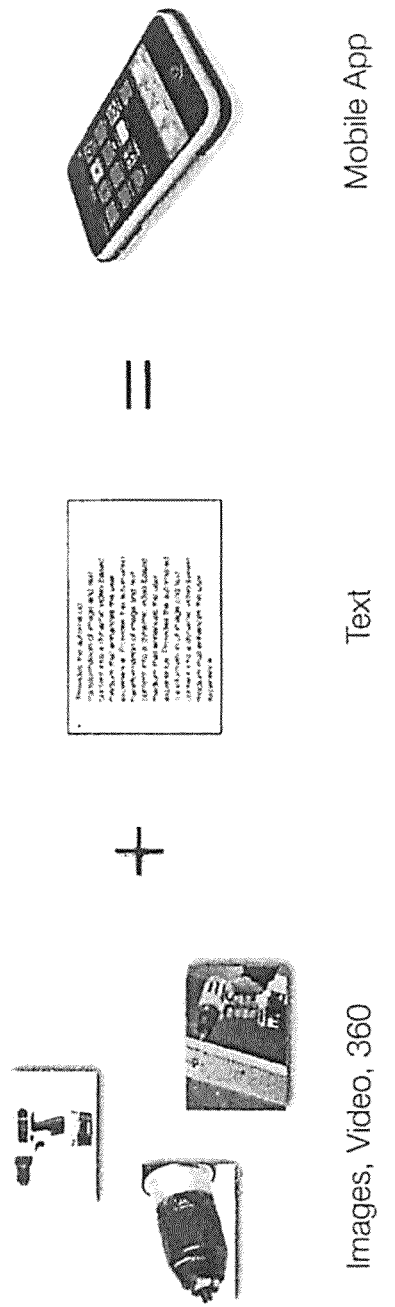
FIG. 2 is a block diagram depicting the combination of images and text to form a mobile application, according to an embodiment of the present invention.
Figure 3:
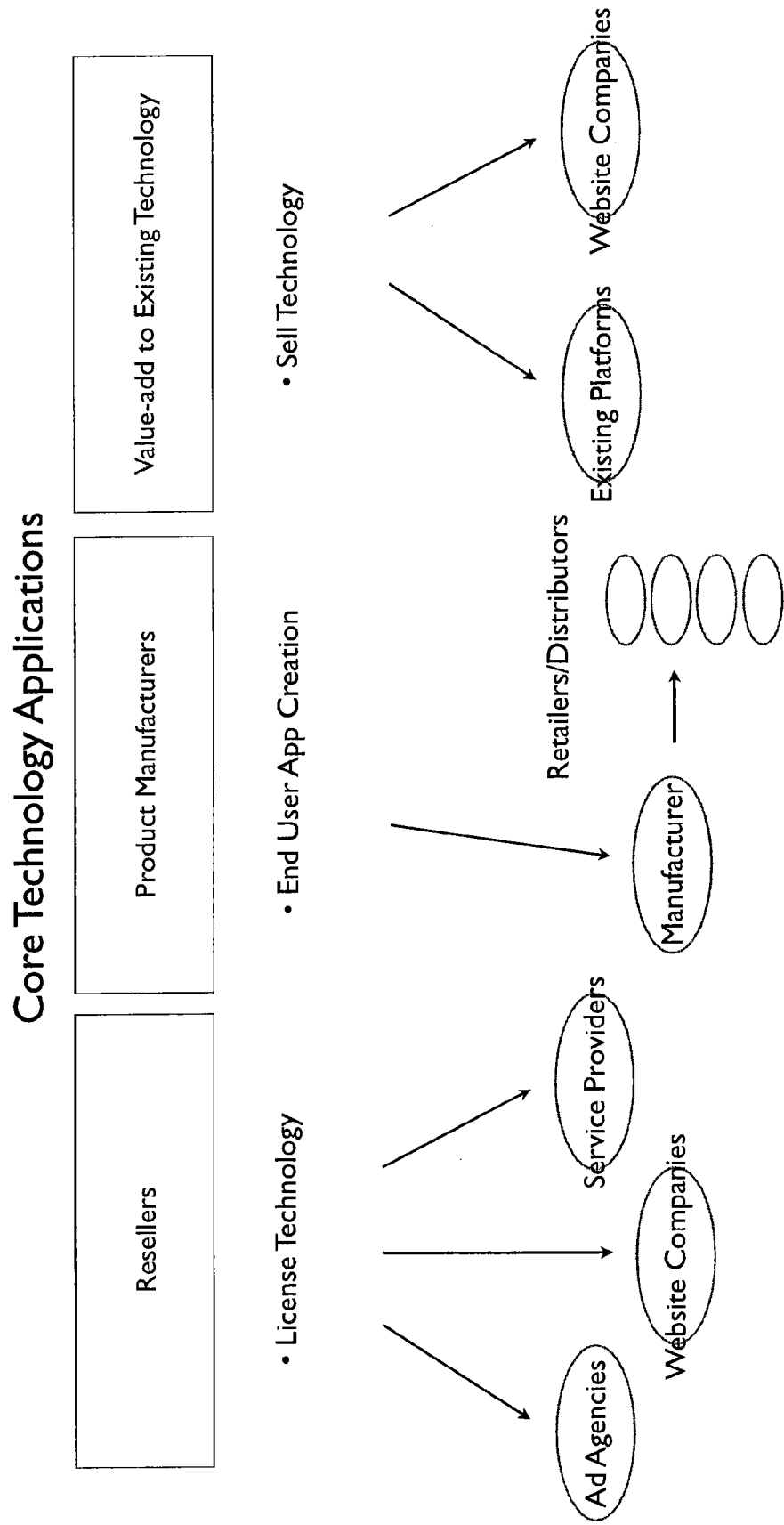
FIG. 3 is a diagram depicting core technology applications of systems and inventions of the present invention.

Referring to FIGS. 1-3, embodiments of the present invention include methods, systems, and devices that allow users to create their own mobile application from existing media. Referring specifically to FIG. 1, a system 90 of the present invention is depicted.

System 90 includes various digital media content, including images 100, video 102, 360° spins 104, text 106, and other such media content. System 90 also includes content management system (CMS) 110, mobile application 112, mobile device 128 and mobile interface 122. System 90 may also include mobile carrier application dashboard 124 and mobile application store or source 126. In one embodiment, store 126 may be an application store such as Apple's iTunes store.

CMS 110 pulls images, video, 360 spins, and text information into mobile application interface 122. The system uses a common code base with unique user ID and CMS system to significantly reduce the time and effort needed to create a new application.

In operation, any of media content 100 to 106 is uploaded or pulled into CMS 110. Content is translated and organized for delivery into mobile application 112. Mobile application 112 receives the translated and organized media content from CMS 110. In an embodiment, mobile application 112 subsequently displays received media content 100 to 106 in the form of media content 114-122. In an embodiment, content 114-122 may include product icons displayed in navigation bars; media displayed in an image viewer, video player, and 360° spin placeholder; product text displayed over media images; and displayed product website information. Mobile application 112 can be pushed to different distribution channels for delivery to mobile devices 124-128.

Combining the use of a CMS 110 and a mobile application 112 front-end enables real-time updates to be performed. Application updates using traditional mobile development requires a re-write of the application code, re-submission to application store, and requires the end user to update their device. With the Mobile Application Creation Platform, system 90, content changes on CMS 110 affect user's mobile devices in real-time, allowing the application to be updated without code changes, re-submittal, or user updating.

System 90 allows scalable, mass distribution of different mobile applications 112. Each application 112 contains a common code base and a unique user ID which interfaces with CMS 110. This user ID pulls unique content 102-106 (images, video, 360 spins, text), from CMS 110 to application 112. In this way, the code base of application 112 can remain the same for each new application. Mobile applications 112 can thusly be created quickly and at a low cost while featuring completely original content.

Although the present invention has been described with respect to the various embodiments, it will be understood that numerous insubstantial changes in configuration, arrangement or appearance of the elements of the present invention can be made without departing from the intended scope of the present invention. Accordingly, it is intended that the scope of the present invention be determined by the claims as set forth.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A method for developing mobile software applications, comprising:
   providing a content management system;
   uploading digital media content to the content management system;
   translating, by the content management system, the digital media content;

organizing, by the content management system, the digital media content;

delivering, by the content management system, the translated and organized media content into a first mobile application, the first mobile application including a first user ID;

delivering, by the content management system, the translated and organized media content into a second mobile application, the second mobile application including a second user ID, wherein the first user ID and second user ID are different, and wherein the first mobile application and the second mobile application share a common code base, and wherein the first mobile application includes a first set of features linked to the first user ID and the second mobile application includes a second set of features linked to the second user ID, the second set of features being different from the first set of features; and updating the first mobile application and the second mobile application based on at least the respective first user ID for the first mobile application and the second user ID for the second mobile application by linking a third set of features with the first user ID for the first mobile application and linking a fourth set of features with the second user ID for the second mobile application, the fourth set of features being different from the third set of features, wherein the common code base shared between the first mobile application and the second mobile application remains the same after updating the first mobile application and the second mobile application, and wherein the updated first mobile application is different than the updated second mobile application.

2. The method of claim 1, said digital media content comprising product icons, images, video, 360 degree spins and text.

3. The method of claim 2, including the step of displaying the images, video, 360 degree spins and text.

4. The method of claim 3, including the step of displaying the product icons in a navigation bar.

5. The method of claim 3, including the step of displaying the digital media content in an image viewer.

6. The method of claim 3, including the step of displaying the digital media content in a video player.

7. The method of claim 3, including the step of displaying the digital media content in a 360 degree placeholder.

8. The method of claim 3, including the step of displaying the text over the images.

9. The method of claim 3, including the step of displaying product website information.

10. The method of claim 1, further comprising:

delivering, by the content management system, the translated and organized media content into a third mobile application, the third mobile application including a third user ID, wherein the first user ID, second user ID, and third user ID are different, and wherein the first mobile application, the second mobile application, and the third mobile application share a common code base, and wherein the third mobile application includes a fifth set of features linked to the third user ID, the fifth set of features being different from the first set of features and the second set of features; and updating the third mobile application based on at least the third user ID for the third mobile application by linking a sixth set of features with the third user ID for the third mobile application, wherein the common code base shared between the first mobile application, the second mobile application, and the third mobile application remains the same after updating the first mobile application, the second mobile application, and the third mobile application, and wherein the updated first mobile application is different than the updated second mobile application and the updated third mobile application, the updated second mobile application is different than the updated first mobile application and the updated third mobile application, and the updated third application is different than the updated first mobile application and the updated second mobile application.

\* \* \* \* \*